(12) United States Patent
Bertin et al.

(10) Patent No.: US 6,335,401 B1
(45) Date of Patent: *Jan. 1, 2002

(54) COPOLYMER GRAFTED VIA RADICAL POLYMERIZATION IN THE PRESENCE OF STABLE RADICALS, ITS PREPARATION AND ITS USES

(75) Inventors: Denis Bertin, Motteville; Bernard Boutevin, Montpellier; Jean-Jacques Robin, Clapiers, all of (FR)

(73) Assignee: Atofina (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/164,717

(22) Filed: Oct. 1, 1998

(30) Foreign Application Priority Data

Oct. 3, 1997 (FR) .............................. 97 12341

(51) Int. Cl.[7] .......................... C08L 51/00; C08F 291/00
(52) U.S. Cl. ...................... 525/242; 525/256; 525/259; 525/303
(58) Field of Search ................................ 525/242, 256, 525/259, 303

(56) References Cited

U.S. PATENT DOCUMENTS

| | | |
|---|---|---|
| 2,935,489 A | 5/1960 | Bader et al. |
| 3,288,739 A | 11/1966 | Natta et al. |
| 4,581,429 A * | 4/1986 | Solomon et al. ............ 526/220 |
| 5,179,160 A | 1/1993 | Orikasa et al. |
| 5,385,974 A | 1/1995 | Ohmae et al. |

FOREIGN PATENT DOCUMENTS

| | | |
|---|---|---|
| DE | 294 493 A | 10/1983 |
| EP | 0 135 280 A | 3/1985 |
| EP | 0 506 006 A | 9/1992 |
| EP | 0 704 465 A | 4/1996 |
| EP | 0 726 280 A | 8/1996 |
| FR | 2569416 A | 2/1986 |

OTHER PUBLICATIONS

Duz et al, CAPLUS AN 1998:577018, Aug. 1998.*
Donato CAPLUS AN 1998:187368, 1987.*

* cited by examiner

*Primary Examiner*—Jeffrey Mullis
(74) *Attorney, Agent, or Firm*—Pennie & Edmonds LLP

(57) ABSTRACT

The present invention relates to a grafted copolymer bearing grafts of formula (I):

$$—O—PM_1—(PM_2)—T \qquad (I)$$

in which:

PM$_1$ represents a polymer block obtained by (co)polymerization of at least one monomer M$_1$ via a radical route; and PM$_2$, which is optionally present, represents a polymer block obtained by (co)polymerization of at least one monomer M$_2$ via a radical route; and T represents the residue of a stable radical T˙.

20 Claims, 1 Drawing Sheet

SINGLE FIGURE
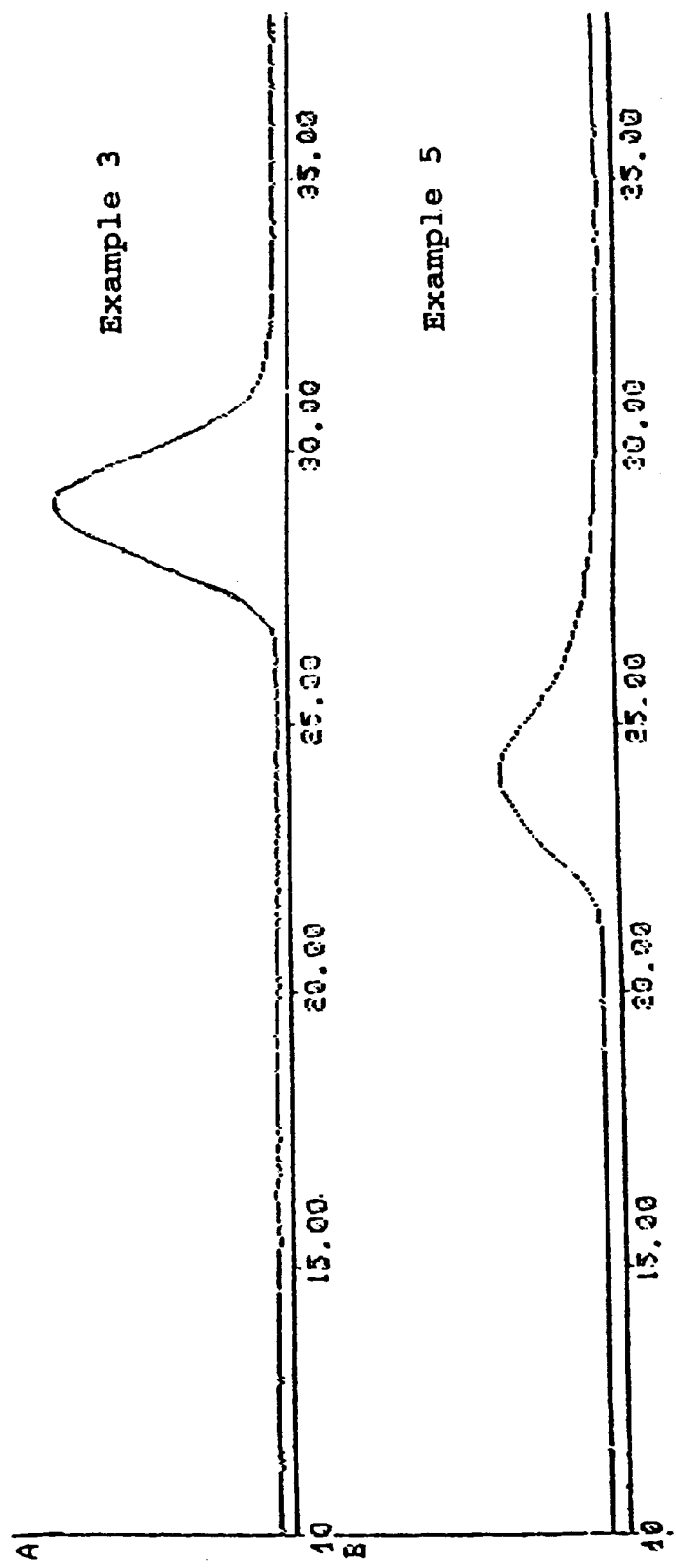

COPOLYMER GRAFTED VIA RADICAL POLYMERIZATION IN THE PRESENCE OF STABLE RADICALS, ITS PREPARATION AND ITS USES

The present invention relates to the radical polymerization of monomers which can be polymerized by this route in the presence of a stable radical and of a macroinitiator containing reactive side functions, in order to synthesize grafted copolymers with control over the number of grafts and the length of these grafts.

European patent application EP-A-0,135,280 describes the synthesis of grafted polymers. However, the routes recommended always involve stripping a proton from a polymer chain by means of a free radical. This technique does not make it possible effectively to control the number of radicals created, and thus the number of grafts on the polymer chain.

The Applicant Company has conducted research into a technique capable of leading to more and shorter grafts than the known technique, which leads to fewer, longer grafts. The novelty of the invention consists, as indicated above, in using a macroinitiator containing peroxide side functions in a radical polymerization in the presence of stable radicals, in order to synthesize grafted copolymers with two main controls. The first regards the introduction of the peroxide side groups, onto which the number of reactive functions can be formed quantitatively, which makes it possible to select the number of grafts on the polymer trunk in order to obtain more or less dense grafting. The second control regards the architecture of these grafts. By virtue of the presence of stable radicals (of nitroxyl type), the mass distribution of the grafts is very well controlled and they can be considered to be of virtually identical length; the stable radicals make it possible to have polydispersity indices generally of less than 1.5. This characteristic gives new properties to the copolymers obtained, which are novel. Furthermore, by means of this control of the chain ends, the synthesis of copolymers grafted with grafts of block copolymer type can be envisaged and achieved. This structure gives properties that are again different to those of the known grafted copolymers.

The system proposed thus provides control of the polymerization, which is effected both on the graft length—the lengths of the grafts being more or less identical—and on the chain ends—which makes it possible to form block copolymers on the grafts.

The subject of the present invention is thus, firstly, a grafted copolymer formed of a (co)polymer trunk bearing grafts of formula (I):

in which:
PM$_1$ represents a polymer block derived from at least one monomer M$_1$ which can be (co)polymerized via a radical route;
PM$_2$, which is optionally present, represents a polymer block derived from at least one monomer M$_2$ which can be (co)polymerized via a radical route; and
T represents the residue of a stable radical T·.

The monomers M$_1$ and M$_2$ are chosen in particular from vinyl, allylic, vinylidene, diene and olefinic monomers.

The term vinyl monomers is understood to refer to (meth)acrylates, vinyl aromatic monomers, vinyl esters, vinyl ethers, (meth)acrylonitrile, (meth)acrylamide and mono- and di(C$_1$–C$_{18}$alkyl)(meth)acrylamides, and monoesters and diesters of maleic anhydride and of maleic acid.

The (meth)acrylates are, in particular, those of the respective formulae:

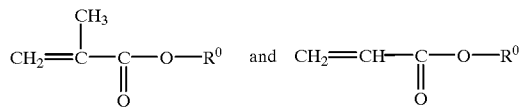

in which R$^0$ is chosen from linear or branched, primary, secondary or tertiary C$_1$–C$_{18}$ alkyl radicals, C$_5$–C$_{18}$ cycloalkyl radicals, (C$_1$–C$_{18}$) alkoxy (C$_1$–C$_{18}$) alkyl radicals, (C$_1$–C$_{18}$)alkylthio (C$_1$–C$_{18}$)alkyl radicals, aryl radicals and arylalkyl radicals, these radicals optionally being substituted with at least one halogen atom and/or at least one hydroxyl group after protection of this hydroxyl group, the alkyl groups above being linear or branched; and glycidyl, norbornyl and isobornyl (meth)acrylates.

As examples of useful methacrylates, mention may be made of methyl, ethyl, 2,2,2-trifluoroethyl, n-propyl, isopropyl, n-butyl, sec-butyl, tert-butyl, n-amyl, isoamyl, n-hexyl, 2-ethylhexyl, cyclohexyl, octyl, isooctyl, nonyl, decyl, lauryl, stearyl, phenyl, benzyl, β-hydroxyethyl, isobornyl, hydroxypropyl and hydroxybutyl methacrylates.

As examples of acrylates of the above formula, mention may be made of methyl, ethyl, n-propyl, isopropyl, n-butyl, sec-butyl, tert-butyl, hexyl, 2-ethylhexyl, isooctyl, 3,3,5-trimethylhexyl, nonyl, isodecyl, lauryl, octadecyl, cyclohexyl, phenyl, methoxymethyl, methoxyethyl, ethoxymethyl and ethoxyethyl acrylates.

For the purposes of the present invention, the term vinyl aromatic monomer is understood to refer to an aromatic monomer containing ethylenic unsaturation, such as styrene, vinyltoluene, α-methylstyrene, 4-methylstyrene, 3-methylstyrene, 4-methoxystyrene, 2-hydroxymethylstyrene, 4-ethylstyrene, 4-ethoxystyrene, 3,4-dimethylstyrene, 2-chlorostyrene, 3-chlorostyrene, 4-chloro-3-methylstyrene, 3-tert-butylstyrene, 2,4-dichlorostyrene, 2,6-dichlorostyrene and 1-vinylnaphthalene.

As vinyl esters, mention may be made of vinyl acetate, vinyl propionate, vinyl chloride and vinyl fluoride, and, as vinyl ethers, mention may be made of vinyl methyl ether and vinyl ethyl ether.

As vinylidene monomer, mention is made of vinylidene fluoride.

The term diene monomer is understood to refer to a diene chosen from linear or cyclic, conjugated or non-conjugated dienes such as, for example, butadiene, 2,3-dimethylbutadiene, isoprene, 1,3-pentadiene, 1,4-pentadiene, 1,4-hexadiene, 1,5-hexadiene, 1,9-decadiene, 5-methylene-2-norbornene, 5-vinyl-2-norbornene, 2-alkyl-2,5-norbornadienes, 5-ethylene-2-norbornene, 5-(2-propenyl)-2-norbornene, 5-(5-hexenyl)-2-norbornene, 1,5-cyclooctadiene, bicyclo[2,2,2]octa-2,5-diene, cyclopentadiene, 4,7,8,9-tetrahydroindene and isopropylidene tetrahydroindene.

As olefinic monomers, mention may be made of ethylene, butene, hexene and 1-octene. Fluoroolefinic monomers may also be mentioned.

The present invention involves a stable free radical. A stable free radical should not beconfused with free radicals which have a fleeting lifetime (a few milliseconds), such as the free radicals derived from the usual polymerization initiators, for instance peroxides, hydroperoxides and azo-type initiators. Free radicals which initiate polymerization tend to accelerate the polymerization. In contrast, stable free radicals generally tend to slow the polymerization down. It can generally be stated that a free radical is stable, for the purposes of the present invention, if it is not a polymerization initiator and if, under the working conditions of the present invention, the average lifetime of the radical is at least 5 minutes. During this average lifetime, the molecules of the stable free radical permanently alternate between the state of a radical and the state of a group linked to a polymer chain via a covalent bond derived from a coupling reaction between a radical centred on an oxygen atom and a radical centred on a carbon atom. Needless to say, it is preferable for the stable free radical to have good stability throughout its use in the context of the present invention. Generally, a stable free radical can be isolated in radical form at room temperature.

The family of stable free radicals includes compounds which act as radical polymerization inhibitors, stable nitroxide radicals, i.e. species comprising the group =N—O·.

Thus, the residue T is that represented by formula (IIa) or (IIb):

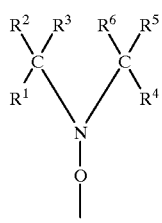

(IIa)

(IIb)

derived from the stable radicals (IIIa) and (IIIb) respectively:

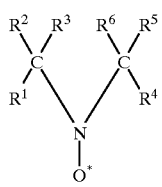

(IIIa)

(IIIb)

in which:
R$^1$, R$^2$, R$^3$, R$^4$, R$^5$, R$^6$, R$^7$ and R$^8$, which may be identical or different, each represent:
a halogen atom, such as chlorine, bromine or iodine;
a linear, branched or cyclic, saturated or unsaturated hydrocarbon-based group, such as an alkyl or phenyl radical;
an ester group —COOR$^9$ or an alkoxy group —OR$^{10}$ or a phosphonate group —PO(OR$^{11}$)$_2$ in which R$^9$, R$^{10}$ and R$^{11}$ each independently represent a linear, branched or cyclic, saturated or unsaturated hydrocarbon-based group;
a polymer chain which can be, for example, a poly (methyl methacrylate) chain, a polybutadiene chain, a polyolefin chain such as polyethylene or polypropylene, but preferably being a polystyrene chain,
it being possible for R$^3$ and R$^6$ to be joined together to form a group

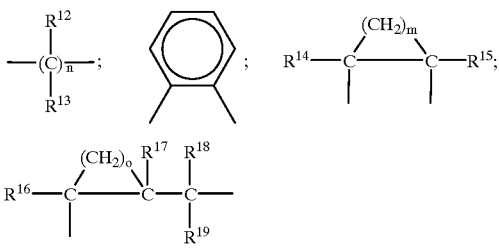

in which
R$^{12}$, R$^{13}$, R$^{14}$, R$^{15}$, R$^{16}$, R$^{17}$, R$_{18}$ and R$^{19}$ each independently represent a hydrogen atom, OH, —COOH, —PO(OH)$_2$, —SO$_3$H or have a meaning chosen from those envisaged above for R$^1$ to R$^8$;
n is equal to 2 or 3, the groups R$^{12}$ and the groups R$^{13}$ borne by the different carbon atoms possibly being identical or different;
m and o each represent an integer from 1 to 10.

Mention may be made in particular of:
2,2,5,5-tetramethyl-1-pyrrolidinyloxy, sold under the name "PROXYLO";
2,2,6,6-tetramethyl-1-piperidinyloxy, sold under the name "TEMPO";
N-tert-butyl-1-phenyl-2-methylpropyl nitroxide;
N-tert-butyl-1-(2-naphthyl)-2-methylpropyl nitroxide;
N-tert-butyl-1-diethylphosphono-2,2-dimethylpropyl nitroxide;
N-tert-butyl-1-dibenzylphosphono-2,2-dimethylpropyl nitroxide;
N-phenyl-1-diethylphosphono-2,2-dimethylpropyl nitroxide;
N-(1-phenyl-2-methylpropyl)-1-diethylphosphono-1-methylethyl nitroxide.

The (co)polymer trunk of the grafted copolymer according to the present invention is in particular a chain of a (co)polymer bearing peroxide functions —O—O—, in particular in a proportion of from 10$^{-3}$ to 10$^{-7}$ mol per gram of (co)polymer trunk and which can be represented by the formula (IV):

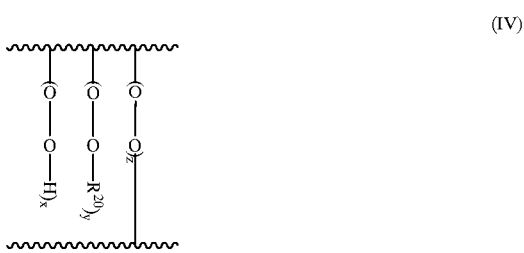

(IV)

in which:

$R^{20}$ represents a hydrogen atom or a linear or branched hydrocarbon-based radical; and x, y and z each represent the percentage of —[O—O—H], —[O—O—R$^{20}$] or —[O—O]— functions respectively, it being possible for each of them to range from 0 to 100%, the —O—O— functions being attached to the chain of the (co)polymer trunk directly or via linker groups, these linker groups then being considered as falling within the definition of the (co)polymer trunk.

The (co)polymer bearing peroxide functions —O—O— is in particular (1) a (co)polymer in which peroxide side functions have been introduced by means of an ionizing source (electron bombardment, gamma rays, plasma treatment), followed by the action of oxygen on the radicals thus prepared, or by means of the combined action of ozone and oxygen, or by means of the corona effect, and which can be chosen from polyolefins, polyv(inyl chloride), poly(vinylidene fluoride) and ethylene/vinyl acetate copolymers, or (2) a copolymer of at least one monomer M chosen from vinyl, allylic, vinylidene, diene and olefinic monomers, with at least one comonomer bearing a peroxide function.

The preparation of the (co)polymers of the family (1) above is described, inter alia, in the patent documents FR-A-2,569,416 and EP-A-0,704,465. According to this route, a (co)polymer of known number-average molecular weight is used directly and peroxide (or hydroperoxide) side functions are created on this (co)polymer by one of the means indicated above. Via these synthetic methods, it is easy to control the number of peroxide groups introduced per polymer chain, since it suffices to adjust the irradiation time and temperature parameters.

The preparation of copolymers of the family (2) above is described, inter alia, in U.S. Pat. No. 5,179,160 and EP-A-0,506,006: it consists in using a monomer functionalized with a peroxide function, and in copolymerizing it with at least one other polymerizable monomer M, chosen from the families indicated above for $M_1$ and $M_2$.

As comonomers bearing a peroxide function, mention may be made of those of formulae (Va) and (Vb):

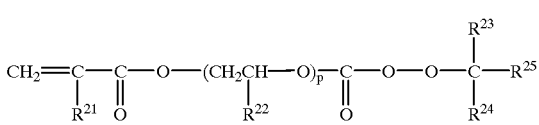

(Va)

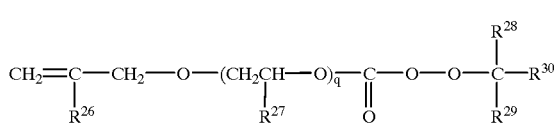

(Vb)

in which:

$R^{21}$ is a hydrogen atom or a $C_1$–$C_2$ alkyl group;

$R^{22}$ and $R^{27}$ each represent a hydrogen atom or a methyl group;

$R^{26}$ represents a hydrogen atom or a $C_1$–$C_4$ alkyl group;

$R^{23}$, $R^{24}$, $R^{28}$ and $R^{29}$ each represent a $C_1$–$C_4$ alkyl group;

$R^{25}$ and $R^{30}$ each represent a $C_1$–$C_{12}$ alkyl group, a phenyl group, a phenyl group substituted with alkyl or a $C_3$–$C_{12}$ cycloalkyl group;

p is equal to 1 or 2; and q is equal to 0, 1 or 2.

Examples of organic peroxides of formula (Va) are:

t-butylperoxyacryloyloxyethyl carbonate;
t-amylperoxyacryloyloxyethyl carbonate;
t-hexylperoxyacryloyloxyethyl carbonate;
1,1,3,3-tetramethylbutylperoxyacryloyloxyethyl carbonate;
cumylperoxyacryloyloxyethyl carbonate;
p-isopropylperoxyacryloyloxyethyl carbonate;
t-butylperoxymethacryloyloxyethyl carbonate;
t-amylperoxymethacryloyloxyethyl carbonate;
1,1,3,3-tetramethylbutylperoxymethacryloyloxyethyl carbonate;
cumylperoxymethacryloyloxyethyl carbonate;
p-isopropylperoxymethacryloyloxyethyl carbonate;
t-butylperoxyacryloyloxyethoxyethyl carbonate;
t-amylperoxyacryloyloxyethoxyethyl carbonate;
t-hexylperoxyacryloyloxyethoxyethyl carbonate;
1,1,3,3-tetramethylbutylperoxyacryloyloxyethoxyethyl carbonate;
cumylperoxyacryloyloxyethoxyethyl carbonate;
p-isopropylperoxyacryloyloxyethoxyethyl carbonate;
t-butylperoxymethacryloyloxyethoxyethyl carbonate;
t-amylperoxymethacryloyloxyethoxyethyl carbonate;
t-hexylperoxymethacryloyloxyethoxyethyl carbonate;
1,1,3,3-tetramethylbutylperoxymethacryloyloxyethoxyethyl carbonate;
cumylperoxymethacryloyloxyethoxyethyl carbonate;
p-isopropylperoxymethacryloyloxyethoxyethyl carbonate;
t-butylperoxyacryloyloxyisopropyl carbonate;
t-amylperoxymethacryloyloxyisopropyl carbonate;
t-hexylperoxyacryloyloxyisopropyl carbonate;
1,1,3,3-tetramethylbutylperoxyacryloyloxyisopropyl carbonate;
cumylperoxyacryloyloxyisopropyl carbonate;
p-isopropylperoxyacryloyloxyisopropyl carbonate;
t-amylperoxymethacryloyloxyisopropyl carbonate;
t-hexylperoxymethacryloyloxyisopropyl carbonate;
1,1,3,3-tetramethylbutylperoxymethacryloyloxyisopropyl carbonate;
cumylperoxymethacryloyloxyisopropyl carbonate; and
p-isopropylperoxymethacryloyloxyisopropyl carbonate.

Examples of peroxides of formula (b) are:

t-butylperoxyallyl carbonate;
t-amylperoxyallyl carbonate;
t-hexylperoxyallyl carbonate;
1,1,3,3-tetramethylbutylperoxyallyl carbonate;
p-menthaneperoxyallyl carbonate;
cumylperoxyallyl carbonate;
t-butylperoxymethallyl carbonate;
t-amylperoxymethallyl carbonate;
t-hexylperoxymethallyl carbonate;
1,1,3,3-tetramethylbutylperoxymethallyl carbonate;
p-menthaneperoxymethallyl carbonate;
cumylperoxymethallyl carbonate;
t-butylperoxyallyloxyethyl carbonate;
t-amylperoxyallyloxyethyl carbonate;
t-butylperoxymethallyloxyethyl carbonate;
t-amylperoxymethallyloxyethyl carbonate;
t-hexylperoxymethallyloxyethyl carbonate;
t-butylperoxyallyloxyisopropyl carbonate;
t-amylperoxyallyloxyisopropyl carbonate;
t-hexylperoxyallyloxyisopropyl carbonate;

t-butylperoxymethallyloxyisopropyl carbonate; and
t-hexylperoxymethallyloxyisopropyl carbonate.

The grafted copolymer according to the present invention has a number-average. molecular weight generally of between 1000 and 10,000,000 g/mol; in accordance with an advantageous characteristic of the present invention, its grafts are of more or less identical length, and of between 500 and 5,000,000 g/mol; furthermore, its polydispersity index is less than or equal to 1.5.

The subject of the present invention is also a process for the manufacture of a grafted copolymer as defined above, characterized in that a thermal radical polymerization is carried out on at least one monomer $M_1$ which can be copolymerized via a radical route using at least one macroinitiator of formula (IV) as defined above, andin the presence of at least one stable radical T˙, in order to obtain a copolymer grafted with grafts of formula (Ia):

—O—PM$_1$—T (Ia)

in which PM$_1$ and T are as defined above, and, where appropriate, at least one monomer $M_2$ which can be copolymerized via a radical route is added to the medium and the (co)polymerization is continued in order to obtain a copolymer grafted with grafts of formula (Ib):

—O—PM$_1$—PM$_2$—T (Ib)

in which PM$_1$, PM$_2$ and T are as defined above.

The following scheme can be given for this polymerization (in which the peroxide functions are the functions —O—O—R$^{20}$ and in which PM$_1$ is present alone):

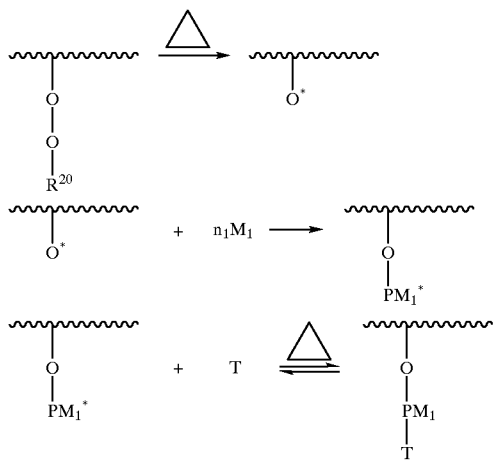

The stable radical T˙ (in particular the nitroxyl radical)—or trapping agent for alkyl radicals—leads to an equilibrium between the macroradical and the dormant species.

The products obtained have virtually identical graft chain lengths since the nitroxyl radicals control the growing macroradicals and make it possible to eliminate the termination reactions by means of recombination or dismutation. These characteristics make it possible to eliminate the presence of crosslinking reactions (derived from the termination reactions by recombination). Furthermore, since the nitroxyl radicals control the chain ends, it is possible to obtain block copolymers on the grafts, as shown in the scheme below:

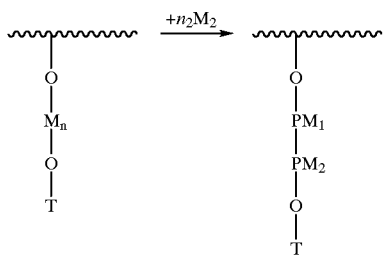

A macroinitiator (IV) with a number-average molecular weight of between 1000 and 10,000,000 g/mol is used in particular.

The stable radical is introduced in particular in a proportion of from 0.001% to 30% by weight relative to the weight of the polymer trunk (macroinitiator).

The (co)polymerization or each polymerization step is carried out at a temperature generally of between 50 and 250° C., generally in the absence of solvent. However, it is possible to work in a solvent or a mixture of solvents such as xylene, chlorobenzene or dichlorobenzene.

The subject of the present invention is, lastly, the use of a grafted copolymer as defined above or prepared by the process as defined above, as a compatibilizing agent, an emulsifier or an adhesion primer.

BRIEF DESCRIPTION OF THE DRAWING

FIG. 1 represents the GPC chromatograms of the polystyrene-grafted polyethylene copolymers of Examples 3 and 5, respectively, the GPC conditions being given in Example 5.

The examples which follow illustrate the present invention without, however, limiting the scope thereof.

Example 1

Synthesis of a Polyethylene Macroinitiator Containing Peroxide Side Functions 50 g of low density polyethylene with a number-average molecular weight of 10,000 g/mol are placed in a jacketed reactor with a working diameter of 40 mm. The ozone generator is a Trailigaz brand generator. The-fluidized bed reactor is placed at a controlled temperature of 40° C.±2° C. and is then irradiated with a stream of air/ozone mixture (flow rate of 700 l/h, ozone generator power of 350 W/h, time 1 h: i.e. 17 g of ozone generated). After this treatment, the reaction medium is placed under a stream of air to remove the residual ozone.

The peroxide groups are then assayed by the iodometric method. The peroxide content measured is $10^{-5}$ mol per gram of polymer.

Example 2

Synthesis of a Polystyrene-grafted Polyethylene Copolymer 1 g of ozonized polyethylene according to Example 1, 10 g of styrene and 0.016 g of 2,2,6,6-tetramethyl-1-piperidinyloxy ("TEMPO") are weighed out in a 50 ml two-necked glass reactor on which is mounted a condenser. The reactor is maintained at 125° C. for 20 hours. At 125° C., the reaction mixture is homogeneous.

Purification of the Reaction Mixture

After reaction for 20 hours, the reaction crude is cooled to room temperature and placed in 100 ml of xylene. This first step removes the homopolystyrene formed during the grafting reaction, which is soluble in cold xylene. The insoluble part is replaced in 50 ml of xylene at 120° C. (homogeneous solution) and is precipitated from 500 ml of acetone. This second step removes the residual homopolystyrene (soluble in acetone) and allows the polystyrene-grafted polyethylene to be recovered, which precipitates from acetone. Several solubilization-precipitation cycles (xylene/acetone) are carried out on the precipitate obtained at each cycle. The number of cycles required is determined until a constant mass of precipitate is obtained: at least three cycles.

Characterization of the Crafted Copolymers

Infrared spectroscopy was used as analysis method to quantify the mass content of polystyrene contained in the block copolymers synthesized and purified. The FTIR spectrometer is a Nicolet brand reference 510 machine. The analysis is carried out on films obtained by hot-pressing (190° C., time of 2 min at 150 bar) on a Darragon brand machine. Using calibration curves obtained from PE/PS mixtures with a variable PS content (from 20 to 95%), the assay of PS in the copolymer was calculated. The calibration curve represents the ratio of the areas of the FTIR peaks vibrating at (1450, 1463 and 1473 $cm^{-1}$) to the peak vibrating at 1493 $cm^{-1}$ as a function of the mass percentage of PS.

Results 1 g of homopolystyrene was collected and 2 g of purified grafted copolymer were recovered with a polystyrene content of 60% by weight, which, considering that there is $10^{-5}$ mol of peroxide per gram of polyethylene, gives graft chain lengths of about 150,000 g/mol for a polymer trunk of 10,000 g/mol.

Example 3

Synthesis of a Polystyrene-grafted Polyethylene Copolymer

The process is performed as in Example 2, except that the initial mixture is composed of 1 g of ozonized polyethylene according to Example 1, 10 g of styrene and 0.0008 g of "TEMPO" (cf. Example 2). The procedure, synthesis, purification and characterization, is subsequently identical to that of Example 2.

After purification and characterization, 1.9 g of homopolystyrene were collected, along with 2.1 g of grafted copolymer. The percentage of polystyrene in the grafted copolymer is 80%, which represents graft lengths of about 200,000,g/mol.

Example 4

Synthesis of a Polystyrene-grafted Polyethylene Copolymer with a Polymer Trunk of High Molecular Weight The process is performed as in Example 2, except that the initial mixture is composed of 1 g of preozonized, low density, high molecular weight polyethylene ($1.8 \times 10^6$ glmol), 10 g of styrene and 0.0008 g of "TEMPO" (cf. Example 2). The procedure, synthesis, purification and characterization, is subsequently identical to that of Example 2.

After purification and characterization, 2.5 g of homopolystyrene were collected, along with 4.1 g of grafted copolymer. The percentage of polystyrene in the grafted copolymer is 80%, which represents graft lengths of about 300,000 g/mol.

Example 5

Demonstration of the Living Nature of the Grafting Copolymerization 1 g of polystyrene-grafted polyethylene copolymer synthesized in Example 3 is dissolved at 125° C. in 10 g of styrene. After reaction for 15 hours, the reaction mixture is completely soluble in cold xylene, whereas the copolymer of Example 3 is insoluble. The increase in the chain lengths of the grafts is confirmed by gel permeation chromatography (GPC) analysis, the apparatus used is a Spectra-Physics SP8810 pump coupled to a Shodex RE61RI brand refractive index detector (the eluent is THF, PL gel $5\mu$ 50A, 100A and styragel HR2 columns). The GPC chromatograms in FIG. 1 of the attached drawing show the change in polymer size, the shorter the elution time, the greater the number-average molecular weight.

For Example 3, the elution time is 29 min and for Example 5, the elution time is 24 min. This difference thus makes it possible to prove the living nature of the grafting copolymerization.

Example 6

Application of the Crafted Copolymer to a Polyethylene/polyetyrene Mixture as a Compatibilizing Agent An initial polyethlene/polystyrene mixture (50/50 by weight) is extruded on a Clextral BC21 twin-screw extruder in the presence or absence of grafted copolymer synthesized in Example 3. The compounds leaving the extruder are then characterized in terms of their Young's modulus and breaking strain. Table 1 summarizes the results.

TABLE 1

Mechanical properties of the polyethylene/polystyrene mixtures in the presence (B) or absence (A) of compatibilizing agent

| Mixture | % grafted copolymer (weight) | Modulus E in $N/mm^2$ | Breaking strain in $N/mm^2$ |
|---|---|---|---|
| A | 0 | 600 | 5 |
| B | 5 | 850 | 9 |

The mechanical property tests are carried out on ISO 1 test pieces obtained by compression. A Zwick brand reference 1456 machine is used to measure the mechanical properties (ISO traction 527 1 and 2 (1993)).

Example 7 (Comparative)

Test for the Synthesis of a Polystyrene-grafted Polyethylene Copolymer Using Non-ozonized Polyethylene The process is performed as in Example 2, except that the initial mixture is composed of 1 g of non-ozonized polyethylene, 10 g of styrene and 0.0016 g of "TEMPO" (cf. Example 2). The procedure is identical to that of Example 2.

After purification and characterization, 0.8 g of polyethylene was collected, but with no presence of polystyrene (no grafting); on the other hand, 4 g of homopolystyrene were found.

What is claimed is:

1. Grafted copolymer bearing grafts of formula (I):

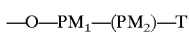  (I)

in which:

PM$_1$ represents a polymer block obtained by (co)polymerization of at least one monomer M$_1$ via a radical route;

PM$_2$, which is optionally present, represents a polymer block obtained by (co)polymerization of at least one monomer M$_2$ via a radical route; and T represents the residue of a stable radical T˙.

2. Grafted copolymer according to claim 1, characterized in that the monomers M$_1$ and M$_2$ are chosen from vinyl, allylic, vinylidene, diene and olefinic monomers.

3. Grafted copolymer according to claim 1, characterized in that the residue T is represented by the formula (IIa) or (IIb):

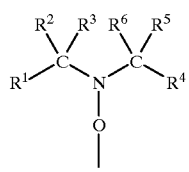 (IIa)

 (IIb)

derived from the stable radicals (IIIa) and (IIIb) respectively:

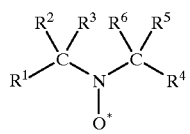 (IIIa)

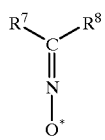 (IIIb)

in which:

R$^1$, R$^2$, R$^3$, R$^4$, R$^5$, R$^6$, R$^7$ and R$^8$, which may be identical or different, each represents:
- a halogen atom;
- a linear, branched or cyclic, saturated or unsaturated hydrocarbon-based group;
- an ester group —COOR$^9$ or an alkoxy group —OR$^{10}$ or a phosphonate group —PO(OR$^{11}$)$_2$ in which R$^9$, R$^{10}$ and R$^{11}$ each independently represents a linear, branched or cyclic, saturated or unsaturated hydrocarbon-based group;
- a polymer chain, wherein R$^3$ and R$^6$ may be joined together to form a group

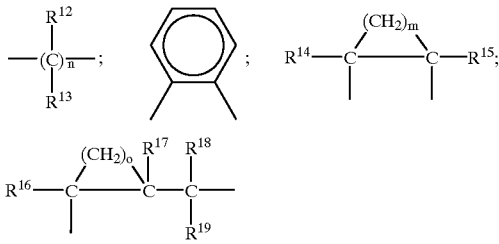

in which

R$^{12}$, R$^{13}$, R$^{14}$, R$^{15}$, R$^{16}$, R$^{17}$, R$^{18}$ and R$^{19}$ each independently represents a hydrogen atom, OH, —COOH, —PO(OH)$_2$, —SO$_3$H, a halogen atom, a linear, branched or cyclic, saturated or unsaturated hydrocarbon-based groups, an ester group —COOR$^9$ or an alkoxy group —OR$^{10}$ or a phosphonate group —PO(OR$^{11}$)$_2$ in which R$^9$, R$^{10}$ and R$^{11}$ each independently represents a linear, branched or cyclic, saturated or unsaturated hydrocarbon-based group, or a polymer chain;

n is equal to 2 or 3, the groups R$^{12}$ and the groups R$^{13}$ borne by the different carbon atoms being identical or different;

m and o each represents an integer from 1 to 10.

4. Grafted copolymer according to claim 3, characterized in that the stable free radical is chosen from:
2,2,5,5-tetramethyl-1-pyrrolidinyloxy;
2,2,6,6-tetramethyl-1-piperidinyloxy;
N-tert-butyl-1-phenyl-2-methylpropyl nitroxide;
N-tert-butyl-1-(2-naphthyl)-2-methylpropyl nitroxide;
N-tert-butyl-1-diethylphosphono-2,2-dimethylpropyl nitroxide;
N-tert-butyl-1-dibenzylphosphono-2,2-dimethylpropyl nitroxide;
N-phenyl-1-diethylphosphono-2,2-dimethylpropyl nitroxide;
N-(1-phenyl-2-methylpropyl)-1-diethylphosphono-1-methylethyl nitroxide.

5. Grafted copolymer according to claim 1, characterized in that the grafted copolymer is formed from a (co)polymer trunk, said (co)polymer trunk is a chain of a (co)polymer bearing peroxide functions —O—O—, wherein said (co)polymer may be represented by the formula (IV):

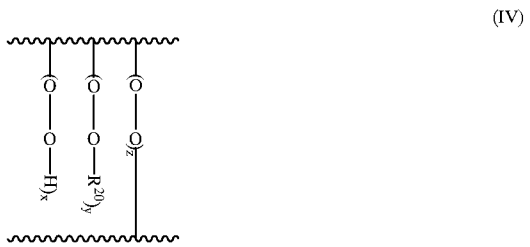 (IV)

in which:

R$^{20}$ represents a hydrogen atom or a linear or branched hydrocarbon-based radical; and x, y and z each represents the percentage of —(O—O—H), —(O—O—R$^{20}$) or —(O—O)— functions respectively, with respect to the sum of said units —(O—O—H), —(O—O—R$^{20}$) and —(O—O)—, wherein each of x, y and z may range from 0 to 100%, the —O—O— functions being attached to the chain of the (co)polymer trunk directly or via linker groups, these linker groups then being considered as falling within the definition of the (co)polymer trunk.

6. Grafted copolymer according to claim 5, characterized in that the (co)polymer bearing peroxide functions —O—O— is (1) a (co)polymer in which the peroxide side functions have been introduced by means of an ionizing source, followed by the action of oxygen on the radicals thus prepared, or by means of the combined action of ozone and oxygen, or by means of the corona effect; or (2) a copolymer of at least one monomer M chosen from vinyl, vinylidene, diene and olefinic monomers, with at least one comonomer bearing a peroxide function.

7. Grafted copolymer according to claim 6, characterized in that the comonomer bearing a peroxide function is chosen from those of formulae (Va) and (Vb):

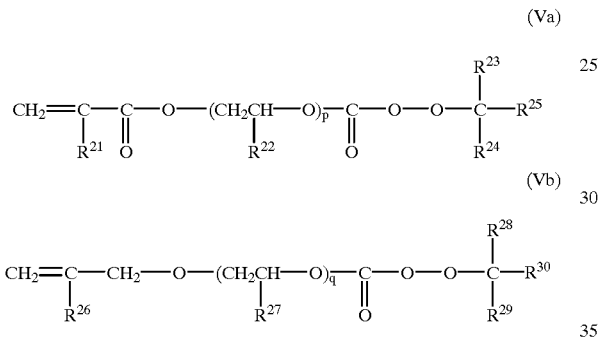

in which:

$R^{21}$ is a hydrogen atom or a $C_1$–$C_2$ alkyl group;

$R^{22}$ and $R^{27}$ each represent a hydrogen atom or a methyl group;

$R^{26}$ represents a hydrogen atom or a $C_1$–$C_4$ alkyl group;

$R^{23}$, $R^{24}$, $R^{28}$ and $R^{29}$ each represent a $C_1$–$C_4$ alkyl group;

$R^{25}$ and $R^{30}$ each represent a $C_1$–$C_{12}$ alkyl group, a phenyl group, a phenyl group substituted with alkyl or a $C_3$–$C_{12}$ cycloalkyl group;

p is equal to 1 or 2; and q is equal to 0, 1 or 2.

8. Grafted copolymer according to claim 6, wherein the (co)polymer (1) is selected among polyolefins, poly(vinyl chloride), poly(vinylidene fluoride) and ethylene/vinyl acetate copolymers.

9. Grafted copolymer according to claim 5, wherein the chain of the (co)polymner bears peroxide functions —O—O— in a proportion of from $10^{-3}$ to $10^{-7}$ mol per gram of (co)polymer.

10. Grafted copolymer according to claim 1, characterized in that its number-average molecular weight is between 1000 and 10,000,000 g/mol.

11. Grafted copolymer according to claim 1, characterized in that the grafts are of substantially identical length and of between 500 and 5,000,000 g/mol.

12. Grafted copolymer according to claim 1, characterized in that its polydispersity index is less than or equal to 1.5.

13. A compatibilizing agent comprising a grafted copolymer as defined in claim 1.

14. An emulsifier comprising a grafted copolymer as defined in claim 1.

15. An adhesion primer comprising a grafted copolymer as defined in claim 1.

16. Process for the manufacture of a grafted copolymer bearing grafts of formula (I):

—O—PM$_1$—(PM$_2$)—T     (I)

in which:

PM$_1$ represents a polymer block obtained by (co)polymerization of at least one monomer M$_1$ via a radical route;

PM$_2$, which is optionally present, represents a polymer block obtained by (co)polymerization of at least one monomer M$_2$ via a radical route; and T represents the residue of a stable radical T·, characterized in that a thermal radical polymerization is carried out on at least one monomer M$_1$ (co)polymerizable via a radical route using at least one macroinitiator of formula (IV):

in which:

$R^{20}$ represents a hydrogen atom or a linear or branched hydrocarbon-based radical; and x, y and z each represents the percentage of —(O—O—H), —(O—O—R$^{20}$) and —(O—O)— functions, respectively, with respect to the sum of said units —(O—O—H), —(O—O—R$^{20}$) and —(O—O)—, wherein each of x, y and z may range from 0 to 100%; and the —O—O— functions being attached to the chain of the macroinitiator directly or via linker groups, these linker groups then being considered as falling within the definition of the macroinitiator, and in the presence of at least one stable radical T·, in order to obtain a copolymer grafted with grafts of formula (Ia):

—O—PM$_1$—T     (Ia)

in which PM$_1$ and T are as defined above, and, where appropriate, at least one monomer M$_2$ (co)polymerizable via a radical route is added to the medium and the (co)polymerization is continued in order to obtain a copolymer grafted with grafts of formula (Ib):

—O—PM$_1$—PM$_2$—T     (Ib)

in which PM$_1$, PM$_2$ and T are as defined above.

17. Process according to claim 11, characterized in that a macroinitiator (IV) with a number-average molecular weight of between 1000 and 10,000,000 g/mol is used.

18. Process according to claim 11, characterized in that the stable radicals introduced in a proportion of from 0.001% to 30% by weight relative to the weight of the (co)polymer trunk.

19. Process according to claim 11, characterized in that the (co)polymerization or each (co)polymerization step is carried out at a temperature of 50 to 250° C.

20. Process according to claim 11, characterized in that the (co)polymerization or each (co)polymerization step is carried out in the absence of solvent.

* * * * *